Patented Nov. 1, 1927.

1,647,539

UNITED STATES PATENT OFFICE.

SHIGE NIISATO, OF LOS ANGELES, CALIFORNIA.

MORDANT PASTE.

No Drawing. Application filed April 21, 1927. Serial No. 185,666.

This invention relates to pastes which are used for mordanting or fixing dyes. It can be used upon both animal and vegetable fibers alike and it will fix the dye so that it will not fade and at the same time gives to the product a glossy appearance.

The paste has been found to be extremely suitable for use with what are known commercially as "Diamond dyes."

The mordant paste consists preferably of the following ingredients: soap which is preferably of a granulated type 45% by weight; tannic acid, 5%; acetic acid, 10%; sodium chloride, 2½% and rice bran water, 37½%.

In making up 8 ounces of paste the following table gives the weights of each of the above ingredients entering into the same: soap 3.6 oz., tannic acid 0.4 oz., vinegar or acetic acid 0.8 oz., sodium chloride 0.2 oz., rice bran water 3.0 oz. or little over; 8.0 oz. total.

It is to be distinctly understood however that the above proportions can be varied within certain limits and the above proportions are merely given for illustrative purposes.

The above ingredients are combined in the following way: The soap, tannic acid and rice bran water are first slowly heated together and stirred. The sodium chloride and the acetic acid are mixed together in a separate container and are then thoroughly mixed with the soap, tannic acid and rice bran water. It is necessary to mix the ingredients in the above set forth manner because unless these precautions are taken the product is liable to curdle.

In some cases it has been found that the product can be obtained without curdling even if all the ingredients have been blended together and mixed at the same time and slowly heated but the first method of combining the ingredients is preferred. If properly blended the paste will be in a smooth and uncurdled condition.

The rice bran water is prepared by taking two parts of water and one part of rice bran which is then boiled for a period of approximately five minutes and is strained through a colander.

The soap used in preparing the paste can be any soluble soap made from a base of potash soda or ammonia and the fatty acids commonly used in the manufacture of soap. It has been found that the soap when used in a granulated condition is eminently suitable for the manufacture of the paste and soap in that condition is recommended.

The paste is dissolved in a dye bath which has been already prepared and in which preferably the "Diamond dyes" are used in the proportion approximately of four tablespoonfuls of paste to each pound of material to be dyed. The bath with the paste therein is then heated gently and allowed to simmer for about fifteen minutes. In using the dyes, of course, for wool and silk animal fabric dyes are used and for cotton and linen vegetable fiber dyes are employed and it has been found that the paste of this invention reacts in a highly satisfactory manner with either type of dye.

By the use of my paste in the dye bath the material is dyed without streaks or spots and at the same time the dyeing operation is quickly and easily carried out. The finished product will not fade and has an extremely attractive and glossy appearance.

It is to be distinctly understood that the above example setting out the ingredients of my paste and the method and procedure to be followed in combining the ingredients is simply by way of example and is not to be construed in a limiting sense in any way whatsoever. The proportions of the ingredients may be varied within certain limits and at the same time they may be combined in slightly different ways within the scope of the following claims.

I claim:

1. As a new article of manufacture a mordant paste comprising soap, tannic acid, acetic acid, sodium chloride and rice bran water.

2. A mordant paste comprising approximately 45% soap, 5% tannic acid, 10% acetic acid, 2½% sodium chloride and 37½% rice bran water.

3. A mordant paste in which approximately 45% of soap is used combined with tannic acid, acetic acid, sodium chloride and rice bran water.

4. The method of combining the ingredients of a mordant paste consisting of soap, tannic acid, rice bran water, sodium chloride and acetic acid which consists in slowly heating and mixing the first three ingredients together and thereafter adding the last two ingredients thereto.

5. The method of combining the ingredients of a mordant paste consisting of soap, tannic acid, rice bran water, sodium chloride and acetic acid which consists in slowly heating and mixing the first three ingredients together and thereafter adding the last two ingredients which have been separately mixed thereto.

6. A mordant paste comprising a soluble salt of a fatty acid, tannic acid, acetic acid, sodium chloride and rice bran water.

SHIGE NIISATO.